Feb. 27, 1945.　　　C. M. ASBILL, JR., ET AL　　　2,370,129
CUTTING MACHINE
Filed July 10, 1943　　　　4 Sheets-Sheet 1

INVENTORS
C. M. ASBILL JR.
G. B. HILL
BY
ATTORNEYS

Feb. 27, 1945.   C. M. ASBILL, JR., ET AL   2,370,129
CUTTING MACHINE
Filed July 10, 1943   4 Sheets-Sheet 3

INVENTORS
C. M. ASBILL JR.
G. B. HILL
BY
ATTORNEYS

Feb. 27, 1945.  C. M. ASBILL, JR., ET AL  2,370,129
CUTTING MACHINE
Filed July 10, 1943  4 Sheets-Sheet 4

INVENTORS
G. M. ASBILL JR.
G. B. HILL
BY
ATTORNEYS

Patented Feb. 27, 1945

2,370,129

UNITED STATES PATENT OFFICE 2,370,129

CUTTING MACHINE

Clarence M. Asbill, Jr., New Orleans, La., and Grover B. Hill, Falls Church, Va., assignors to Claude R. Wickard, as Secretary of Agriculture of the United States of America, and his successors in office Application July 10, 1943, Serial No. 494,144

1 Claim. (Cl. 146—98)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a cutting machine, with particular reference to one designed for cutting cotton into short fibers, but it is useful for cutting other fibrous materials such as tobacco leaves, corn stalks and so forth, and may also be used for cutting sheet materials which are easily sheared into strips.

The invention has among its objects the provision of a machine of small size but having a large cutting capacity; one which is continuous in its operation; one which is capable of long use; and such other objects as will be apparent from the following description and claim and annexed drawings, in which Figure 1 is a side elevation of the machine, certain parts being removed and others broken away for purposes of illustration;

Figure 1:
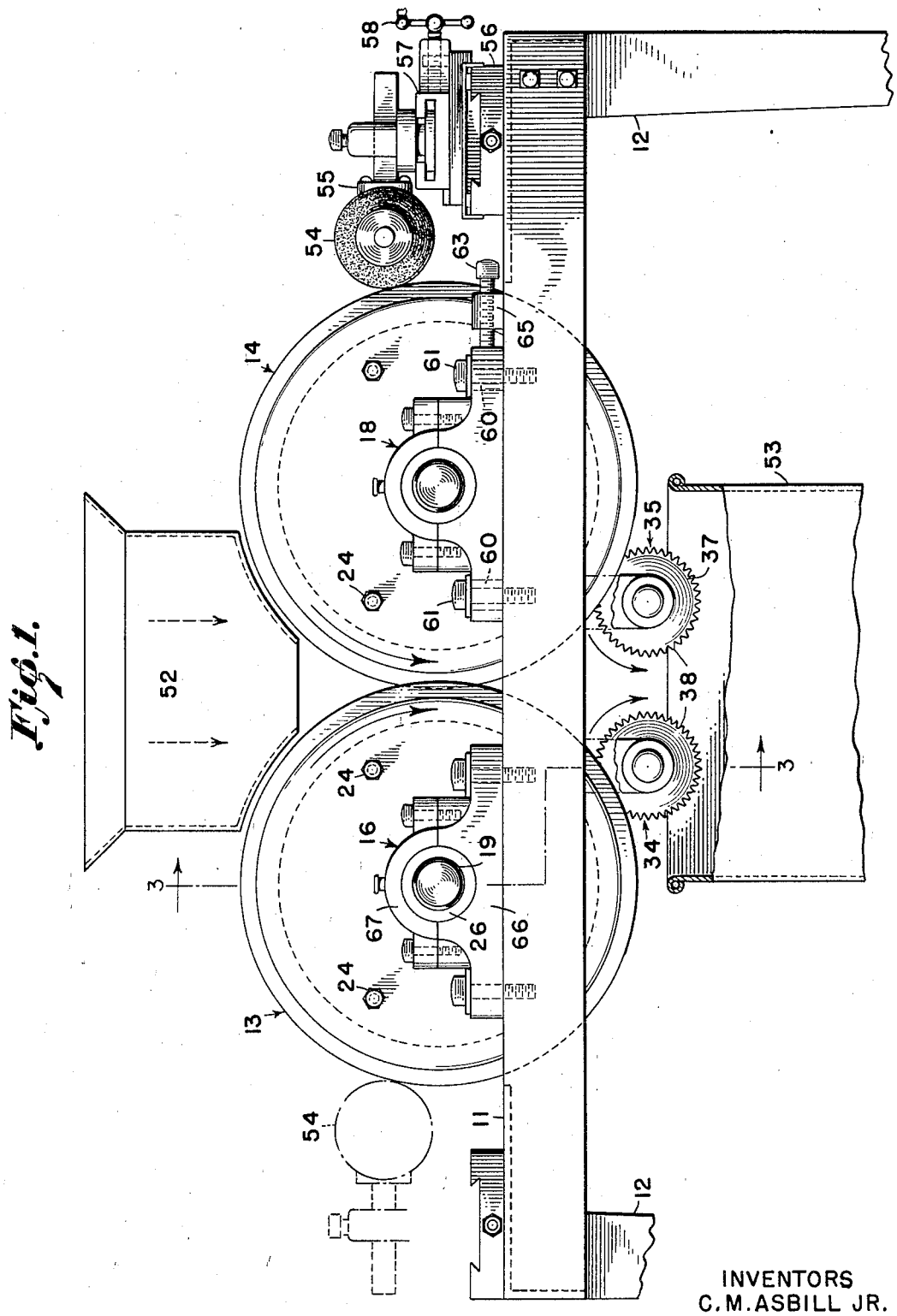
Figure 2:
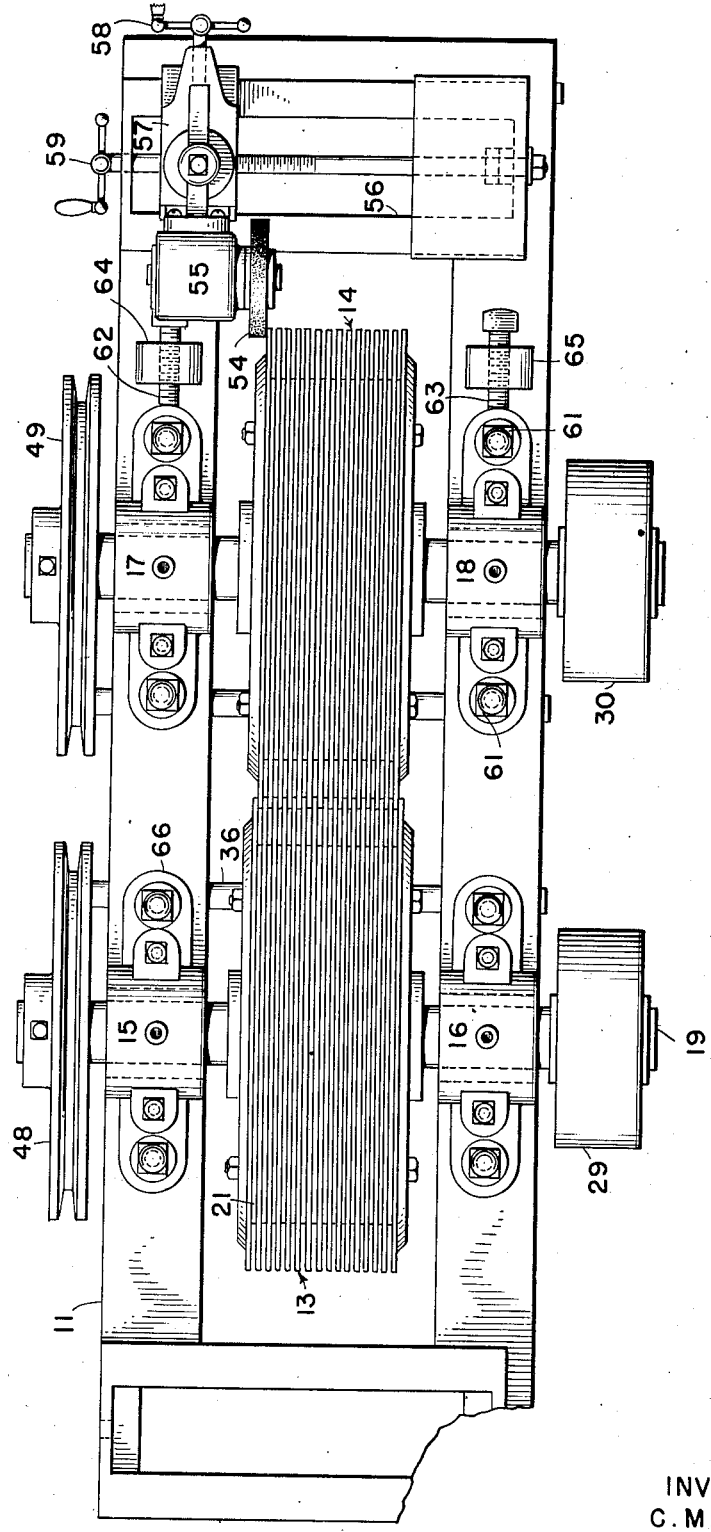
Figure 2 is a top plan view.

Referring to the drawings, the cutter mechanism is supported on a rectangular rigid frame 11 having a supporting leg 12 at each of its corners. A pair of cutters 13 and 14 are rotatably mounted in pairs of pillar-blocks 15—16 and 17—18, respectively, mounted on top of the frame.

Cutter 13 comprises a cutter-shaft 19 on which is concentrically fixed a plurality of cutting discs 20 having cylindrical peripheries and parallel flat faces adjacent the peripheries, thereby providing a cutting edge at each edge of each cylindrical periphery. The cutting discs are held spaced from each other by a plurality of smaller cutter-spacing discs 21, one positioned between each of the cutting discs, and all the discs are clamped together between end plates 22 and 23, by clamping bolts 24 passing through the discs and end plates. The assembly of discs is fixed to shaft 19 by a key 25. Shaft 19 is journaled at its ends in suitable bearings 26 and 27 held in the pillar-blocks 15 and 16, respectively.

Cutter 14 is similar in structure to cutter 13, except that the cutting discs and cutter-spacing discs of cutter 14 are matched with the cutter-spacing discs and cutter discs of cutter 13, respectively.

Cutters 13 and 14 are so mounted on the frame with their cutter-shafts parallel that the peripheries of the cutting discs of one cutter will mesh between the peripheries of the cutting discs of the other cutter, and the thicknesses of the cutting and cutter-spacing edges are so selected that the cutting discs of each cutter operate with those of the other to produce a shearing action. For cutting fine material, such as cotton, the cutting discs must mesh with substantially no clearance.

Figure 4:
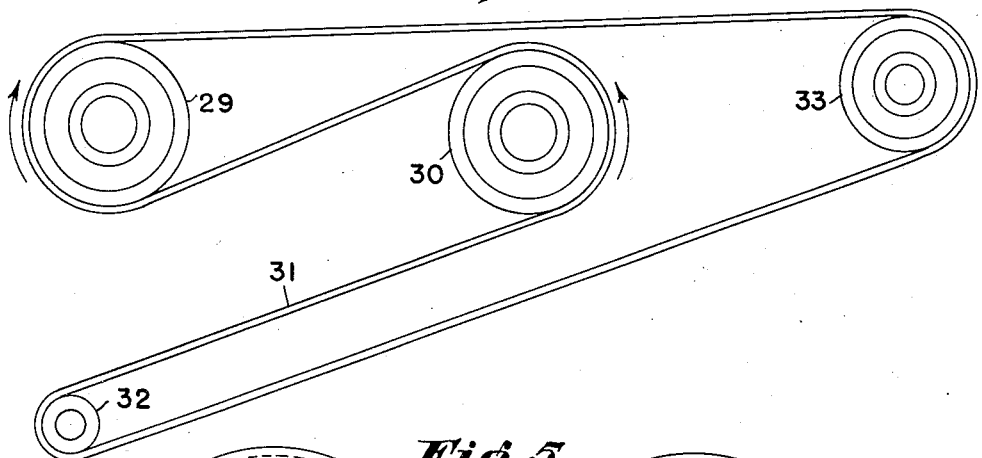
Figure 4 is a diagram of a suitable drive-belt system.

The cutter-shafts project beyond the ends of the bearings 26 and 27, and are provided at one side of the machine with means for rotating the cutters in opposite directions comprising belt pulleys 29 and 30, driven in opposite directions as indicated by the arrows in the drawings, by a drive belt 31. The belt 31 is driven by a power-pulley 32 which may be rotated by any desirable power means, and is belted over a belt-tightening or idler pulley 33, in the manner illustrated in Figure 4. Pulley 33 may be mounted on the frame in any desirable manner.

Figure 3:
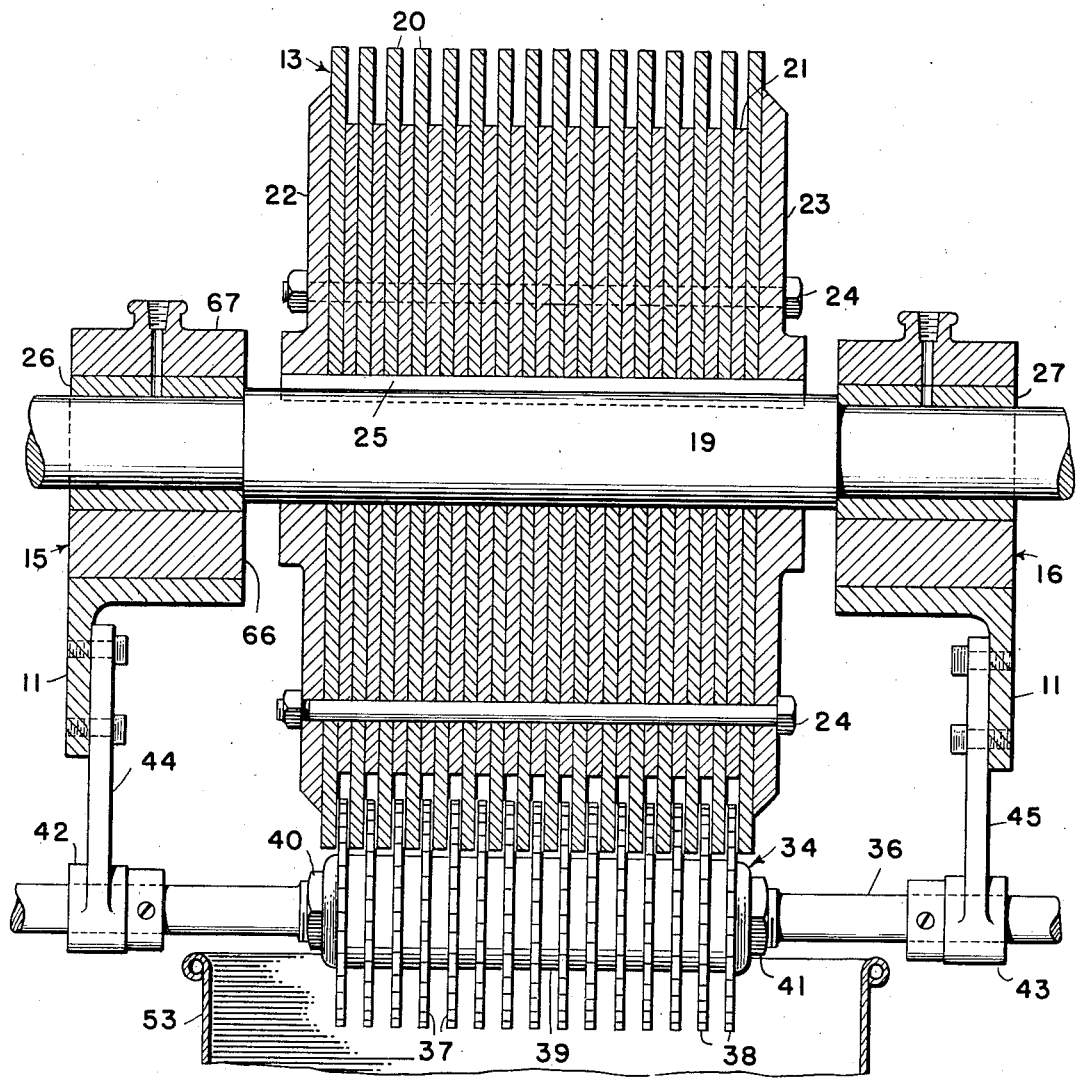
Figure 3 is a partial section on the line 3—3 of Figure 1.

In cutting certain types of materials, part of the cut material tends to cling between the cutting discs. Means to remove this material continuously is provided by a pair of clearers 34 and 35, one associated with each cutter. The clearers are similar and only one, clearer 34, is shown in detail in Figure 3. It comprises a clearer shaft 36 carrying a plurality of clearer discs 37, provided with teeth 38 on their peripheries and mounted to rotate with the toothed peripheries positioned between the cutting discs. The clearer discs are held spaced apart by clearer-spacing discs 39, and all the discs are held together by clamping nuts 40 and 41 threaded on the clearer-shaft.

Clearer-shaft 36 is journaled at its ends in suitable bearings 42 and 43 fixed to the frame 11 by brackets 44 and 45.

Figure 5:
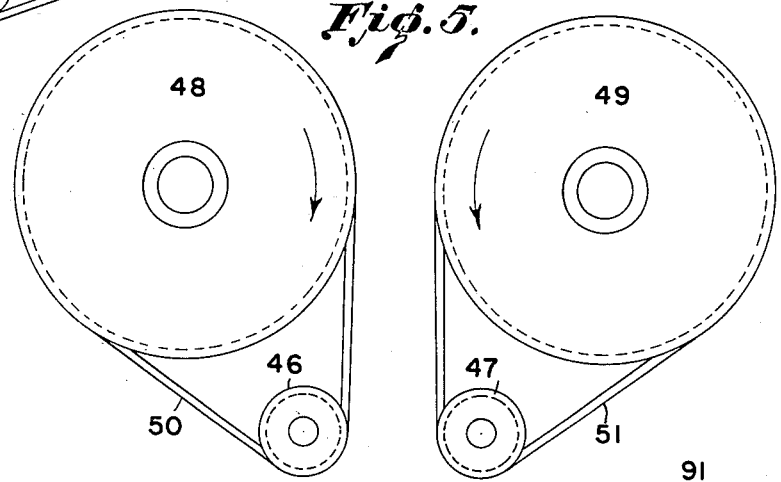
Figure 5 is a diagram of the belt system for driving the clearers.

The ends of the clearer-shafts project beyond the bearings on the side of the machine opposite pulleys 29 and 30 and have belt pulleys 46 and 47 fixed to them. The ends of the cutter-shafts are also projected beyond their bearings on this side of the machine and have belt pulleys 48 and 49 fixed to them. Belts 50 and 51 are belted over pulleys 48 and 46 and over pulleys 49 and 47, in the manner illustrated in Figure 5. This provides for rotating each of the clearers in the same direction as that of the cutter with which it is associated. Thus, any material tending to cling between the cutting discs is removed by the toothed clearer discs.

In operation, the material to be cut may be fed between the cutters at the top from a suitable chute or hopper 52 opening at its bottom between the cutters. The cut material issues from between the cutters at the bottom, and is deposited in a receptacle 53 which may be the opening of a suitable materials conveyor.

Means for sharpening the cutting discs is provided by a sharpener having a grinding wheel 54 driven by an electric motor 55 and mounted on a rack 56 suitably attached to the frame 11. The sharpener is secured to the carriage 57 and is movable toward the cutter by operation of a hand-crank 58, and is movable transversely thereof by operation of a hand-crank 59. The sharpener, shown in Figure 1, is in position for sharpening the discs of cutter 14, but it may be positioned on the other end of the frame for sharpening the discs of cutter 13.

The arrangement is such that the cutting discs may be sharpened while the machine is in use.

Provision is made for adjustment of the cutters toward each other to compensate for wear and sharpening. One set 17 and 18 of the pillar-blocks is adjustably mounted on the frame with one pillar-block on one side member and the other pillar-block on the opposite side member of the frame, by providing elongated slots 60 in the pillar-blocks for receiving the mounting bolts 61. Screws 62 and 63 are threaded through lugs 64 and 65 on the frame 11 and into engagement with the pillar-blocks 17 and 18, respectively. The adjustment is made by loosening the mounting bolts 61 and separately operating screws 62 and 63 to move cutter 14 nearer cutter 13. This arrangement also provides means of adjusting the cutter-shafts to obtain precise parallelism of the axes of rotation of the cutters.

The sharpener shown provides a simple means of sharpening the cutting discs, but results in squared cutting edges. If desired, a properly designed grinding wheel may be used to provide for hollow grinding of the cutting surfaces, giving a better cutting edge but requiring more care in the sharpening operation.

A simple bearing arrangement for the cutter is shown in Figure 1. Referring to the left end of the figure, for example, the lower half 66 of the pillar-block is bolted directly to the frame 11, and the upper half 67 is bolted to the lower half to hold the bearing 26 in place.

The cutters are mounted on their shafts, and are so adjusted longitudinally of the shafts to bring the cutting discs of one into proper alinement for meshing with those of the other. Any slight misadjustments or irregularities are not harmful, since the cutting discs are quite thin and flexible, and being unsupported at their peripheries they will give sufficiently to mesh properly without damage to the cutting edges. However, adjustment of pillar-blocks 17 and 18 prevents excessive or harmful misadjustments.

Figure 6:
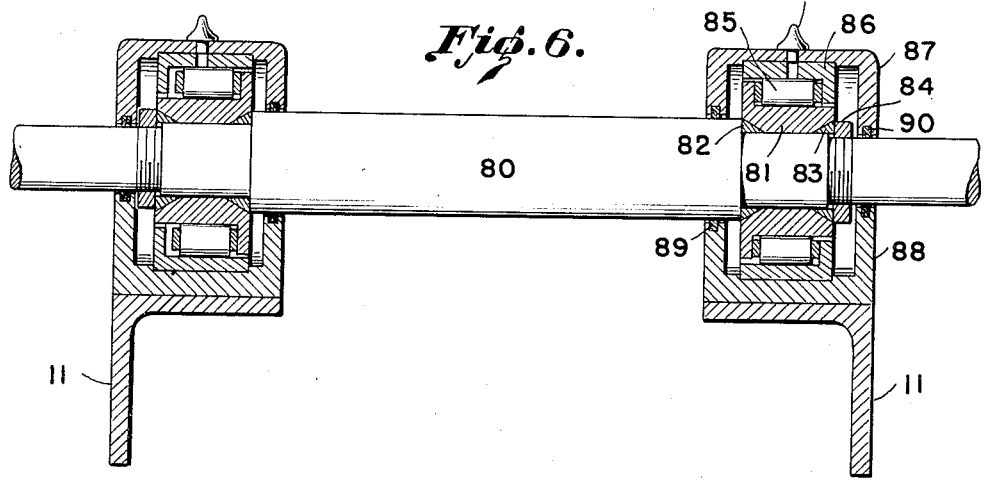
Figure 6 is a fragmentary section of a shaft and bearing arrangement for the cutters.

A modified type of bearing arrangement for each of the cutters is illustrated in Figure 6, in which the cutter-shaft 80 is provided at one of its ends with an inner roller race 81 clamped thereto by tapered bushings 82 and 83 and clamp nut 84. The roller assembly 85 is held against longitudinal movement between the races in the manner illustrated. The outer roller race 86 is held clamped between the lower and upper halves 87 and 88 of the pillar-block. Grease retainers 89 and 90 are provided, and grease may be inserted into the bearing through a fitting 91.

The bearing at the other end of the shaft is similar, except that clearance is permitted in the manner illustrated for allowing some movement of the roller assembly longitudinally to compensate for expansion and contraction of the shaft and allow tolerance in mounting the pillar-blocks, thus making easier the assembling of the parts.

The cutting capacity of the machine depends on the number of cutting discs used and on the speed of rotation of the cutters. The cutter corresponding to cutter 13 must be provided with at least two cutting discs and the other cutter with at least one. Considering its overall size, the machine has a very high cutting capacity. For example, cutters of 20-inch diameter and 20-inch length, using cutting discs $\frac{1}{16}$ inch thick and rotated at 1,000 R. P. M., will make 198 simultaneous cuts at about 60 miles per hour.

The long length of total cutting edge and high speed of rotation of the cutters result in a small amount of cutting action per unit length of cutting edge with a resultant small wear, infrequent sharpening, and long life of the cutting discs. When the discs are worn to such extent as to make them useless, they are easily replaced with new ones.

Due to the continuous cutting action and the fact that all moving parts are rotated and that by adjustment of the bearings precise parallelism of the axes of rotation of the cutters is obtained, the machine runs very smoothly.

Having thus described the invention, what is claimed is:

A cutting machine comprising a rigid frame, a pair of cutters each provided with a plurality of spaced-apart cutting discs, each of said discs having parallel flat faces adjacent the periphery and having a cutting edge at each edge of its periphery, the spacing of the discs being such that when the cutters are meshed together the cutting edges on one cutter will produce a shearing action with the cutting edges of the other, each cutter being provided with a cutter-shaft on which the discs are concentrically fixed, one of the cutter-shafts being rotatably mounted in a bearing at each of its ends with its bearings each attached to the frame, and the other cutter-shaft being parallel to the first-mentioned cutter-shaft and mounted in a bearing at each of its ends with its bearings each movably attached to the frame, whereby the bearings of the last-mentioned cutter shaft may be separately adjusted toward those of the other to mesh the peripheries of the cutting discs of one cutter between those of the other and to obtain precise parallelism of the axes of rotation of the cutters, said discs being sufficiently thin and flexible near the cutting edges that they will give sufficiently to prevent damage to the discs in case of slight misadjustment of the bearings, and means for rotating the cutters in opposite directions.

CLARENCE M. ASBILL, Jr.
GROVER B. HILL.